(12) United States Patent
Konno et al.

(10) Patent No.: US 7,826,137 B2
(45) Date of Patent: Nov. 2, 2010

(54) REFLECTIVE OPTICAL CIRCULATOR

(75) Inventors: Yoshihiro Konno, Tokyo (JP); Masaru Sasaki, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 45 days.

(21) Appl. No.: 12/281,901

(22) PCT Filed: Mar. 8, 2007

(86) PCT No.: PCT/JP2007/054531

§ 371 (c)(1), (2), (4) Date: Dec. 5, 2008

(87) PCT Pub. No.: WO2007/102579

PCT Pub. Date: Sep. 13, 2007

(65) Prior Publication Data

US 2009/0304392 A1    Dec. 10, 2009

(30) Foreign Application Priority Data

Mar. 9, 2006    (JP) .................... 2006-064124

(51) Int. Cl.
G02B 5/30 (2006.01)
G02B 27/28 (2006.01)

(52) U.S. Cl. .............. 359/484; 359/495; 359/497; 385/11; 385/47; 385/126

(58) Field of Classification Search ............. 359/281, 359/484, 495, 497; 385/11, 47, 126
See application file for complete search history.

(56) References Cited

U.S. PATENT DOCUMENTS 5,689,360 A * 11/1997 Kurata et al. ............... 359/281
5,768,005 A * 6/1998 Cheng et al. ............... 359/281

(Continued)

FOREIGN PATENT DOCUMENTS

EP    0874263 A1    1/1998

(Continued)

OTHER PUBLICATIONS

International Search Report through Japanese Receiving Office for PCT/ISA/220 dated Apr. 3, 2007.

*Primary Examiner*—Ricky D Shafer
(74) *Attorney, Agent, or Firm*—Studebaker & Brackett PC; Donald R. Studebaker

(57) ABSTRACT

Provided is a reflective optical circulator capable of improving characteristics by preventing the occurrence of PDL and non-uniformity of insertion losses of reciprocating optical paths. The reflective optical circulator includes: an optical element unit having a first polarization separating element, a 45° non-reciprocal polarization plane rotating element, a phase element for rotating a polarization plane of an incident light by 90°, and a second polarization separating element; a light incidence/emission unit; a lens; and a reflector. All waveguides are disposed at an equivalent distance from a central point, and a shift amount of an extraordinary ray in the second polarization separating element is set to be larger than a shift amount of an extraordinary ray in the first polarization separating element. In addition, the phase element is constructed with two phase optical elements, and only one polarization component is allowed to transmit through the two phase optical elements.

2 Claims, 13 Drawing Sheets

U.S. PATENT DOCUMENTS

| | | | | |
|---|---|---|---|---|
| 5,930,418 A | * | 7/1999 | Chang | 385/24 |
| 5,930,422 A | * | 7/1999 | Cheng | 385/47 |
| 6,154,581 A | * | 11/2000 | Lu et al. | 385/11 |
| 6,236,506 B1 | * | 5/2001 | Cao | 359/484 |
| 6,239,900 B1 | * | 5/2001 | Chen et al. | 359/282 |
| 6,246,518 B1 | * | 6/2001 | Chang et al. | 359/494 |
| 6,263,131 B1 | * | 7/2001 | Frisken et al. | 385/31 |
| 6,275,637 B1 | * | 8/2001 | Chang et al. | 385/126 |
| 6,480,331 B1 | * | 11/2002 | Cao | 359/484 |
| 6,493,139 B1 | * | 12/2002 | Liu et al. | 359/484 |
| 7,072,111 B2 | * | 7/2006 | Iwatsuka | 359/484 |
| 2005/0111102 A1 | | 5/2005 | Iwatsuka | |

FOREIGN PATENT DOCUMENTS

| | | |
|---|---|---|
| JP | 11072747 | 3/1999 |
| JP | 2000231080 | 8/2000 |
| JP | 2002228984 | 8/2002 |
| JP | 2002528765 T | 9/2002 |
| JP | 2005148703 | 5/2005 |
| JP | 2006317614 | 11/2006 |
| JP | 2006317624 | 11/2006 |

* cited by examiner

US 7,826,137 B2

REFLECTIVE OPTICAL CIRCULATOR

TECHNICAL FIELD

The present invention relates to an optical circulator used for an optical communication system, optical measurement or the like, and more particularly, to a reflective optical circulator having a reflector for forming a reciprocating optical path by reflecting light.

BACKGROUND ART

An optical circulator is a non-reciprocal optical device having important roles in an optical communication system, optical measurement or the like. The optical circulator has at least three ports. For example, in case of an optical circulator having three ports indicated by reference numerals 1, 2, and 3, in a forward direction of 1->2, 2->3, 3->1, light is propagated with low loss, and in a backward direction of 3->2, 2->1, 1->3, light is propagated with high loss.

However, since the optical circulator has a structure where light is propagated from one port to other opposite ports in the propagation direction, there is a problem that the number of optical elements is increased, so that the optical circulator has a large size. In addition, if the number of ports is increased, the number of optical elements is further increased, thus the optical elements has a larger size. Therefore, there is a problem that it is difficult to implement the optical circulator having multiple ports. For this reason, there has been proposed a reflective optical circulator having a reflector for forming a reciprocating optical path (for example, refer to Patent Documents 1 and 2). In the reflective optical circulator, the number of optical elements is not increased even in case of having multiple ports, and its size is small in comparison with a conventional structure.

Patent Document 1: Japanese Patent Application Publication No. 2000-231080 (Pages 2 to 5, FIGS. 1 to 6

Patent Document 2: Japanese Patent Application Publication (Japanese Publication of PCT Application) No. 2002-528765 (Pages 38 to 39, FIG. 12

As shown in FIG. 16, in an optical circulator 100 disclosed in Patent Document 1, four array-type optical fibers 101 are used in an light incidence/emission port (light incidence/emission unit), and a birefringent element 103, a first phase element 104 including two half-wave elements, a polarization plane rotating element 105, and a composite birefringent element 106 including two birefringent elements are disposed between the array-type optical fibers 101 and a lens 102. In addition, a second phase element 107, and a reflector 108 are disposed behind the lens 102.

As shown in FIG. 17, in an optical circulator 109 disclosed in Patent Document 2, a non-linearly-arrayed optical fiber bundle 110 is used in an light incidence/emission port (light incidence/emission unit), and two birefringent elements 111a and 111b, two Faraday rotators 112 and 113 (or a polarization plane rotating element 114), and a reflecting prism 115 as a reflector are disposed. The rotation directions of the two Faraday rotators 112 and 113 are adapted to be opposite to each other.

However, as shown in FIG. 18, the four optical fibers 101 constituting light incidence/emission ports of the optical circulator 100 are disposed in a linear array constitution as seen in the z-axis direction of FIG. 16. Therefore, central axes of the optical fibers P1 to P4 cannot be disposed at equivalent distance from a central point C of diagonal lines connecting the central axes of the optical fibers P1 to P4, and outer optical fibers P3 and P4 are disposed at longer distance from the central point C. As a result, a difference in optical path length between the inner reciprocating optical path (for example, P1->P2) and the outer reciprocating optical path (for example, P3->P4) occurs, and thus, non-uniformity of insertion losses of reciprocating optical paths occurs. Accordingly, in the conventional optical circulator 100, it is difficult to stabilize the insertion losses.

DISCLOSURE OF THE INVENTION

Problems to be Solved by the Invention

In the optical circulator 100, since the directions of crystalline axes of the birefringent element 103 and the composite birefringent element 106 are adapted to be perpendicular to each other, the optical fibers P1 to P4 need to be disposed in a linear shape. If not, it is impossible to obtain a coupling of each reciprocating optical path with each cross section of the optical fibers P1 to P4. For this reason, in the constitution of the optical circulator 100, it has been impossible to prevent non-uniformity of the insertion losses.

On the other hand, as shown in FIG. 19, the light incidence/emission ports constructed with the three optical fibers P1 to P3 of the optical circulator 109 are disposed in a non-linear constitution as seen in the z-axis direction of FIG. 17. Therefore, central axes of the optical fibers P1 to P3 are disposed at equivalent distance from a central point C of diagonal lines connecting the central axes of the optical fibers P1 to P3. As a result, non-uniformity of insertion losses of reciprocating optical paths can be prevented.

However, since each of the birefringent elements 116 to 119 has a constitution where only one of two polarization components is shifted, polarization dependent loss (PDL) occurs.

In consideration of the problems, an object of the present invention is to provide a reflective optical circulator having improved characteristics by preventing an occurrence of PDL and non-uniformity of insertion loss of each reciprocating optical path.

Means for Solving the Problems

The present invention disclosed in Claim 1 provides a reflective optical circulator having an optical element unit, said optical element unit comprising: a first polarization separating element, a non-reciprocal polarization plane rotating element having a rotation angle of 45°, a phase element for rotating a polarization plane of an incident light by 90°, and a second polarization separating element, wherein a light incidence/emission unit where at least three waveguides are arrayed is disposed at one end side of the optical element unit, and a lens and a reflector are disposed at a side opposite to the light incidence/emission unit with the optical element unit interposed between the light incidence/emission unit and both the lens and the reflector, wherein the first polarization separating element, the polarization plane rotating element, the phase element, and the second polarization separating element are sequentially disposed from the side of the light incidence/emission unit, wherein all the waveguides are disposed at an equivalent distance from a central point of diagonal lines connecting central axes of the waveguides, wherein directions of crystal axes on optical planes of the first and second polarization separating elements s are different from each other by 45°, wherein a shift amount of an extraordinary ray in the second polarization separating element is set to be larger than a shift amount of an extraordinary ray in the first polarization separating element, wherein a direction of the rotation angle of the polarization plane rotating element is set to be counterclockwise as seen from the light incidence/emission unit, wherein the phase element is constructed with two phase optical elements s which are a first phase optical element and a second phase optical element, a size of each phase optical element is set so that only one polarization component of two polarization component among a ordinary ray and an extraordinary ray separated by the first polarization separating element can transmit through, and each of the phase optical elements is disposed so that only one polarization component can transmit through the two phase optical elements, wherein, among the two polarization components separated by the first polarization separating element, the polarization component that becomes an extraordinary ray at the time of transmitting through the first polarization separating element transmits through the first phase optical element, and the polarization component that becomes a ordinary ray transmits through the second phase optical element, wherein a size of the second polarization separating element is set so that the light emitted from the light incidence/emission unit and reflected by the reflector transmits through only one among the going path and the returning path of the optical path of light reciprocating the optical element unit, wherein the two polarization components are reflected by the reflector with a point symmetry, wherein a reflection point of the reflector and an optical axis of the lens are located along the same line in a propagation direction of light, and the central point of the diagonal lines connecting the central axes of the waveguides and the optical axis of the lens are not located along the same line, and wherein the second polarization separating element is disposed so that a light in the forward direction is incident on the second polarization separating element before being reflected by the reflector.

The present invention disclosed in Claim 2 provides a reflective optical circulator according to Claim 1, wherein the reflector is a concave mirror.

EFFECTS OF THE INVENTION

According to an optical circulator of the present invention, the optical circulator can be adapted in a constitution where all waveguides can be disposed at an equivalent distance from a center of diagonal lines connecting central axes of waveguides.

Therefore, non-uniformity of insertion loss of each reciprocating optical path in the optical circulator can be prevented, so that it is possible to stabilize the insertion losses.

In addition, it is possible to prevent an occurrence of PDL which is caused from shift of only one polarization component when light passes through the second polarization plane separating element. In addition, since the reflector reflects two polarization components with point symmetry, a difference in optical path length between the two polarization components before and after reflection can be adjusted to be zero. Therefore, it is also possible to prevent the occurrence of PDL.

In addition, the second polarization separating element is disposed so that a light in the forward direction is incident on the second polarization separating element before the light is reflected by the reflector. Therefore, it is possible to prevent the occurrence of PDL and to implement small-sized optical elements.

In addition, since central axes of all the waveguides are disposed at an equivalent distance from the center of diagonal lines connecting the central axes of waveguides, distances between light incidence/emission cross sections of the waveguides and the optical axis of the lens disposed at the sides of the light incidence/emission cross sections of the waveguides can be set to be equivalent.

Therefore, a diameter of a light beam emitted from the lens and a diameter of a light beam incident on the lens can be adjusted to have the same size. Accordingly, it is possible to easily adjust centers of the light incidence/emission unit, the optical element unit, and the lens and the reflector disposed at the side opposite to the light incidence/emission unit.

In addition, since the optical circulator having the reflector is constructed with the reciprocating optical paths, a total length of the optical circulator can be reduced, so that it is possible to implement a small-sized optical circulator.

In addition, since the reflector is constructed with a concave mirror, a tolerance of coupling of the optical element unit of the optical circulator with the lens disposed at the side opposite to the light incidence/emission unit can be alleviated, so that it is possible to easily adjust the centers of the light incidence/emission unit, the optical element unit, and the lens.

REFERENCE NUMERALS

Figure 1:
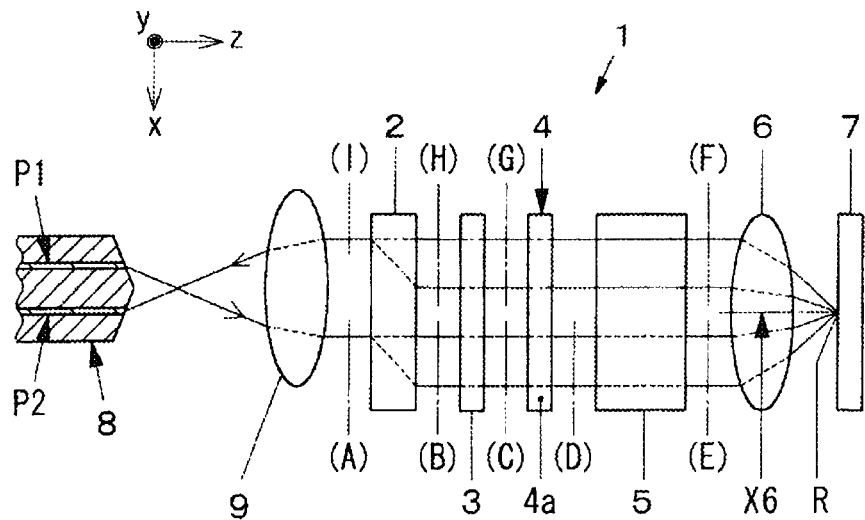
FIG. 1 is a plan view illustrating a constitution of an optical circulator according to the present invention and an optical path of a light in a forward direction.

1: optical circulator
2: first polarization separating element
3: polarization plane rotating element
4: phase element
4a: first phase optical element
4b: second phase optical element
5: second polarization separating element
6, 9: lens
7: reflector
8: light incidence/emission unit
10: ferrule

BEST MODE FOR CARRYING OUT THE INVENTION

Figure 2:
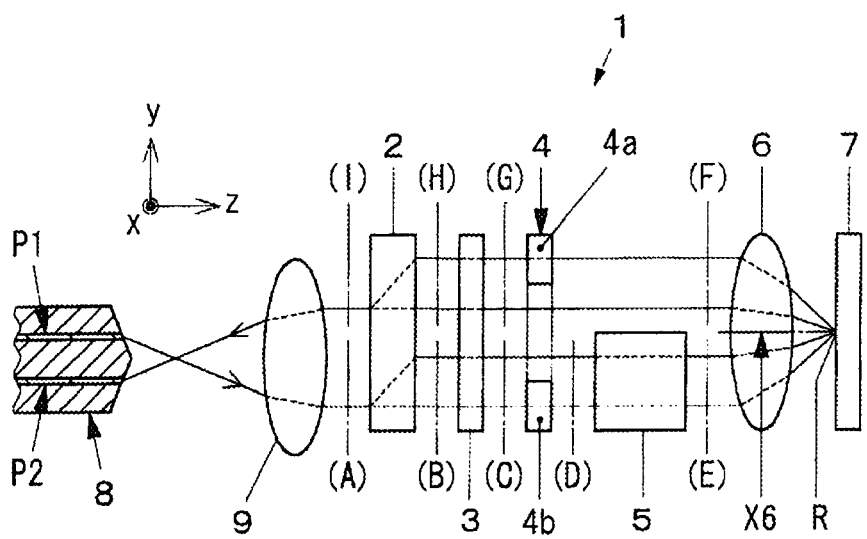
FIG. 2 is a side view illustrating a constitution of an optical circulator according to the present invention and an optical path of the light in the forward direction.

Hereinafter, best mode embodiment of optical circulators according to the present invention will be described in detail with reference to FIGS. 1 to 14. In each figure, x-axis to z-axis correspond to those of each figure. In FIGS. 1 and 2, the light propagating direction is denoted by the z-axis, horizontal and vertical directions in a plane perpendicular to the z-axis are denoted by x-axis and y-axis, respectively. FIGS. 1 and 2 illustrate the constitution and layout of each of optical elements from the light incidence/emission unit 8 to the reflector 7 of the optical circulator 1. Optical paths where the light passes through internal portions of each of the optical elements are indicated by dashed lines, and the other optical paths are denoted by solid lines.

As shown in FIGS. 1 and 2, the optical circulator 1 according to the present invention includes an optical element unit having a first polarization separating element 2 (hereinafter, referred to as a polarization separating element 2), a polarization plane rotating element 3, a phase element 4, and a second polarization separating element 5 (hereinafter, referred to as a polarization separating element 5). In addition, a light incidence/emission unit 8 is disposed at one end side of the optical element unit. A lens 6 and a reflector 7 are disposed at the side opposite to the light incidence/emission unit 8 with the optical element unit interposed between the light incidence/emission unit 8 and both the lens 6 and a reflector 7.

Each of the optical elements of the optical element unit is sequentially disposed in the z-axis direction from the light incidence/emission unit 8 in the sequence of the polarization separating element 2, the polarization plane rotating element 3, the phase element 4, and the polarization plane rotating element 5. It is preferable that anti-reflection coating of $SiO_2$/$TiO_2$ or the like is performed on each optical surface of each optical element. In addition, description and illustration of a magnet for applying a magnetic field to the polarization plane rotating element 3 are omitted.

Figure 3:
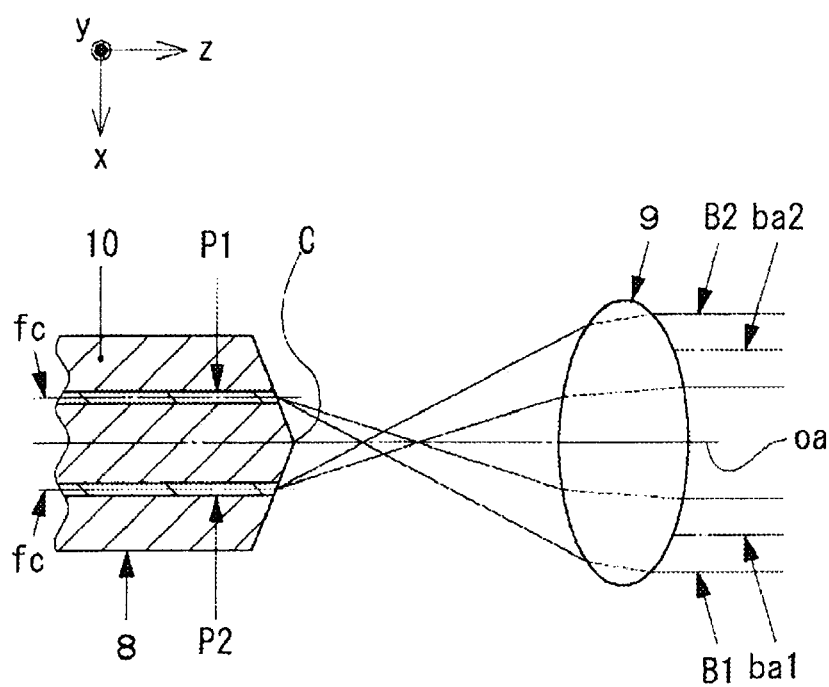
FIG. 3 is a schematic view illustrating a constitution of a light incidence/emission unit.
Figure 4A:
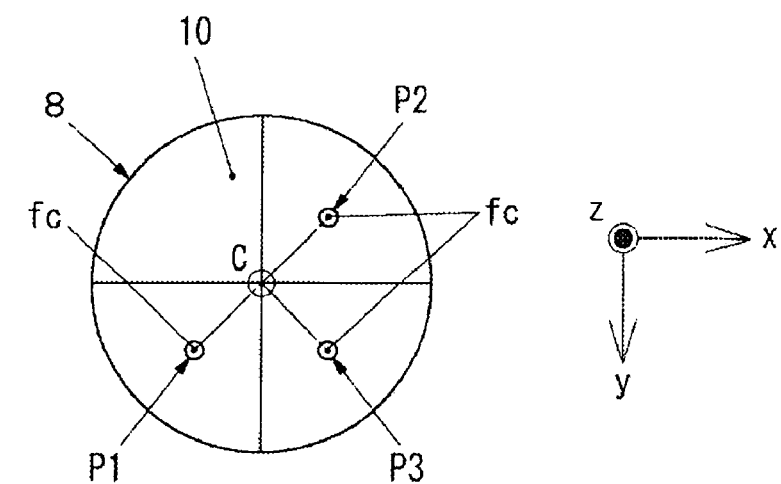
FIGS. 4(*a*) and 4(*b*) are views illustrating a constitution of a ferrule for inserting and maintaining of optical fibers.
Figure 4B:
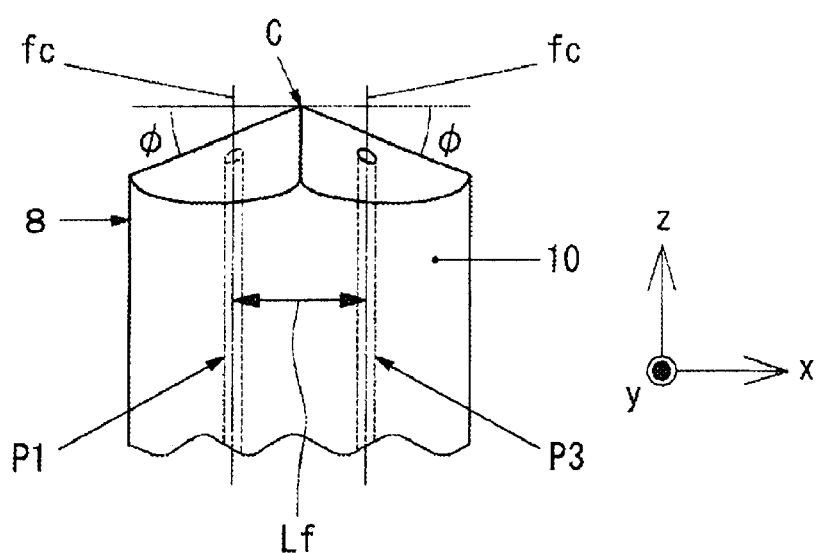

FIG. 3 is a schematic view illustrating a constitution of the light incidence/emission unit 8. FIG. 4(a) is a front view illustrating a constitution of a ferrule 10 for inserting and maintaining of optical fibers P1 to P3, and FIG. 4(b) is a side view illustrating the constitution of the ferrule 10. As shown in FIG. 3, in the light incidence/emission unit 8, a plurality of the optical fibers P1 to P3 used as the waveguides are disposed so that core axes are parallel to each other, and the light incidence/emission cross sections of the optical fibers P1 to P3 are not perpendicular to the central axes fc of the optical fibers P1 to P3. A lens 9 is provided to the side of each of light incidence/emission cross sections of the optical fibers P1 to P3.

Each of the optical fibers P1 to P3 is inserted and maintained in each hole of three-core ferrule 10. As shown in FIG. 4(a), distances from the centers of the holes to the central point C of the ferrule 10 are set to be equivalent. Therefore, since the central point C of diagonal lines connecting the central axes fc of the optical fibers P1 to P3 inserted into the holes is located on the central point C, all the optical fibers P1 to P3 can be maintained by the ferrule 10, so that the optical fibers P1 to P3 can be disposed at the equivalent distance from the central point C. However, a spacing Lf between adjacent optical fibers can be determined in consideration of a relationship between a back focus of the lens 6 and a thickness and a separation width of the polarization separating element 2.

In addition, as shown in FIG. 3, the lens 9 and the ferrule 10 are disposed to be aligned to each other so that the optical axis oa of the lens 9 and the central point C of the ferrule 10 are located along the same line in the z-axis direction. The lens 9 and the ferrule 10 are disposed in such a manner, and thus, the central point (the aforementioned central point C) connecting each of the optical fibers P1 to P3 and the optical axis oa of the lens 9 are located along the same line. Therefore, the ferrule 10 maintains the optical fiber P1 to P3 so that the central axes fc of all the optical fibers P1 to P3 are disposed at an equivalent distance from the optical axis oa of the lens 9.

In addition, as shown in FIG. 4, the light incidence/emission cross sections of all the optical fibers P1 to P3 are formed in a slanted shape with the same slant angle φ. FIG. 4 exemplifies a case where the cross section of the ferrule 10 is formed to include four planes so as for the central point C to be a vertex in terms of easiness of manufacturing, so that the light incidence/emission cross sections of the optical fibers P1 to P3 can be formed in a slanted shape.

A plurality of the optical fibers P1 to P3 are constructed with a single mode fiber (SMF), and a graded index fiber (GIF) (not shown) is attached to the cross sections of the light incidence/emission side. Due to forming the GIF, it is possible to extend a mode field diameter (MFD) of the light incidence/emission end of each of the optical fibers P1 to P3 and to suppress a spreading angle of an emitted light to be small. For the extension of the MFD, the present invention is not limited to the attachment of the GIF, but a TEC process may be performed on the optical fibers, or a micro lens may be disposed.

The lens 9 collimates or converges the incident light. An aspheric lens, a ball lens, a plano-convex lens, a profiled refractive index lens, or the like may be used.

The polarization separating element 2 is an optical element for separating the light emitted from each of the optical fibers P1 to P3 into a ordinary ray and an extraordinary ray and mixing the ordinary ray and extraordinary ray reflected by the described-later reflector 7 and incoming thereto. A birefringent single crystal such as rutile (TiO$_2$), calcite (CaCO$_3$), yttrium orthovanadate (YVO$_4$), and alpha-barium borate ($\alpha$BaB$_2$O$_4$) is used for the polarization separating elements 2 and 5. In addition, the direction of crystal axis X22 (refer to FIGS. 5 and 11) with respect to the optical plane of the polarization separating element 2 is set to be in a range of about 42° to about 50° (most preferably, 47.8°) with respect to a line normal to the optical plane so as to obtain a maximum of separation width.

The polarization plane rotating element 3 is a non-reciprocal polarization plane rotating element for rotating a polarization plane of a polarization component of a light transmitting through the polarization separating element 2. The polarization plane rotating element is formed by using a material having a rotation angle of 45° in a used wavelength band and being as thin as possible. For example, garnet, TBIG, GBIG, or the like can be used most preferably. In the embodiment, a garnet single crystal where a direction of rotation angle is set to a counterclockwise direction as seen in the z-axis direction from the light incidence/emission unit 8 is used.

Figure 5:
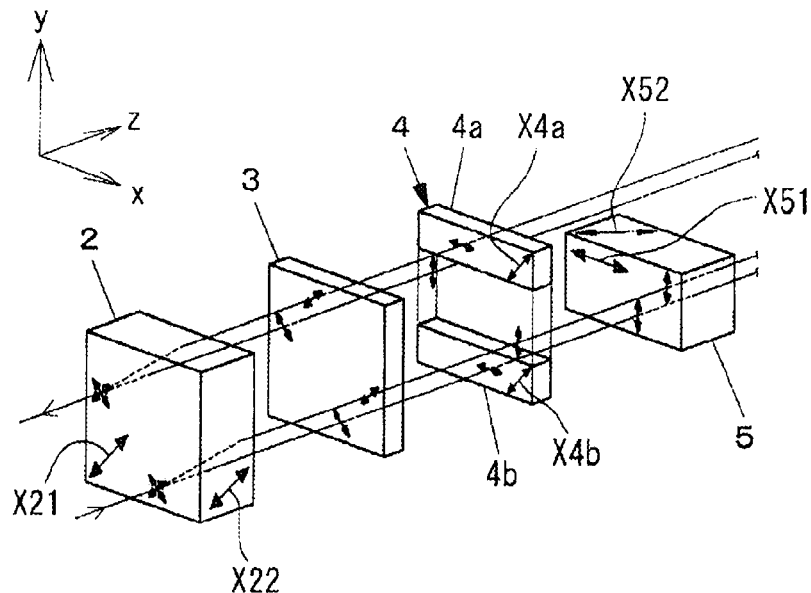
FIG. 5 is a perspective view illustrating a layout of optical elements of an optical element unit in the optical circulator illustrated in FIG. 1 and a polarization state of a propagating light in the forward direction.

The phase element 4 is an optical element for rotating, with a rotating angle of 90°, a polarization plane of polarization components (ordinary ray and extraordinary ray) of the light which transmits through the polarization plane rotating element and is incident thereto. For example, a reciprocal polarization plane rotating element such as a garnet such as TBIG (terbium bismuth iron garnet) and GBIG (gadolinium bismuth iron garnet) and quartz, or a half-wave element is used for the phase element. In case of using the half-wave element, as shown in FIG. 5, the phase element is constructed with a first phase optical element 4a (hereinafter, referred to as a phase optical element 4a) of which the direction of the crystal axis X4a is slanted with 45° with respect to y-axis and a second phase optical element 4b (hereinafter, referred to as a phase optical element 4b) of which the direction of the crystal axis X4b is also slanted with 45° with respect to y-axis. In case of using the reciprocal polarization plane rotating element, a plate as thin as possible, such as a 0-th order single plate or a first order single plate, is preferably used. If a higher order wavelength plate is used, a wavelength characteristic and a temperature characteristic deteriorate.

As shown in FIG. 5, a size of the polarization separating element 5 is set so that the light of either the going path or the returning path among the paths of the light reciprocating the optical element unit by the reflection from the reflector 7 can be transmitted through. In addition, the direction of the crystal axis X52 with respect to the line normal to the optical plane of the polarization separating element 5 is set to be in a range of about 42° to about 50° (most preferably, 47.8°) with respect to the x-axis. However, the direction of the crystal axis X51 on the optical plane is set to be parallel to the x-axis direction. In addition, the direction of the crystal axis X21 on the optical plane of the polarization separating element 2 is set to have an angle of 45° with respect to the x-axis direction. Therefore, the directions of the crystal axes X21 and X51 of the first and second polarization separating elements 2 and 5 are different by 45° from each other.

The lens 6 collimates or converges the incident light. An aspheric lens, a ball lens, a plano-convex lens, a profiled refractive index lens, or the like may be used. However, for the lens 6, a lens having a back focus can be used, so that the optical element unit can be disposed between the light incidence/emission unit 9 and the lens. In the embodiment, an aspheric lens is used.

The reflector 7 is a reflecting mirror for reflecting a light passing through the polarization plane rotating element 6. In the embodiment, a total reflection mirror where a surface of a substrate is coated with, for example, SiO$_2$/TiO$_2$ is used.

Figure 7:
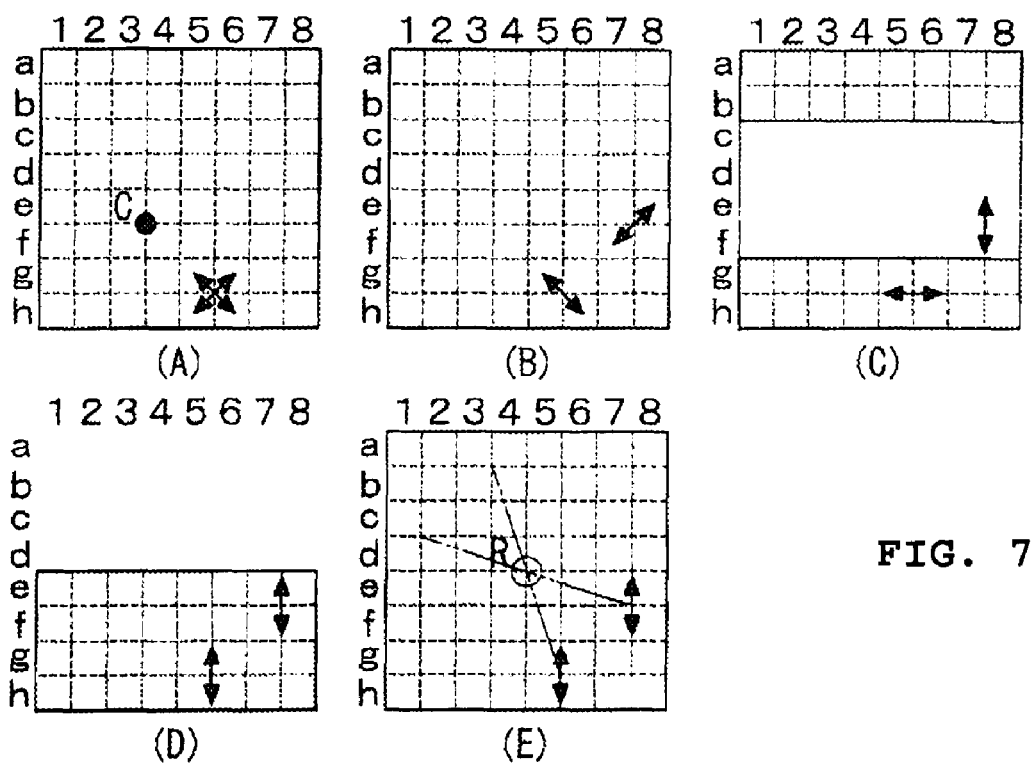
FIG. 7 is a view for explaining a polarization state of a propagating light emitted from an optical fiber P1, which propagates before being reflected by reflector in the optical circulator illustrated in FIG. 1.
Figure 8:
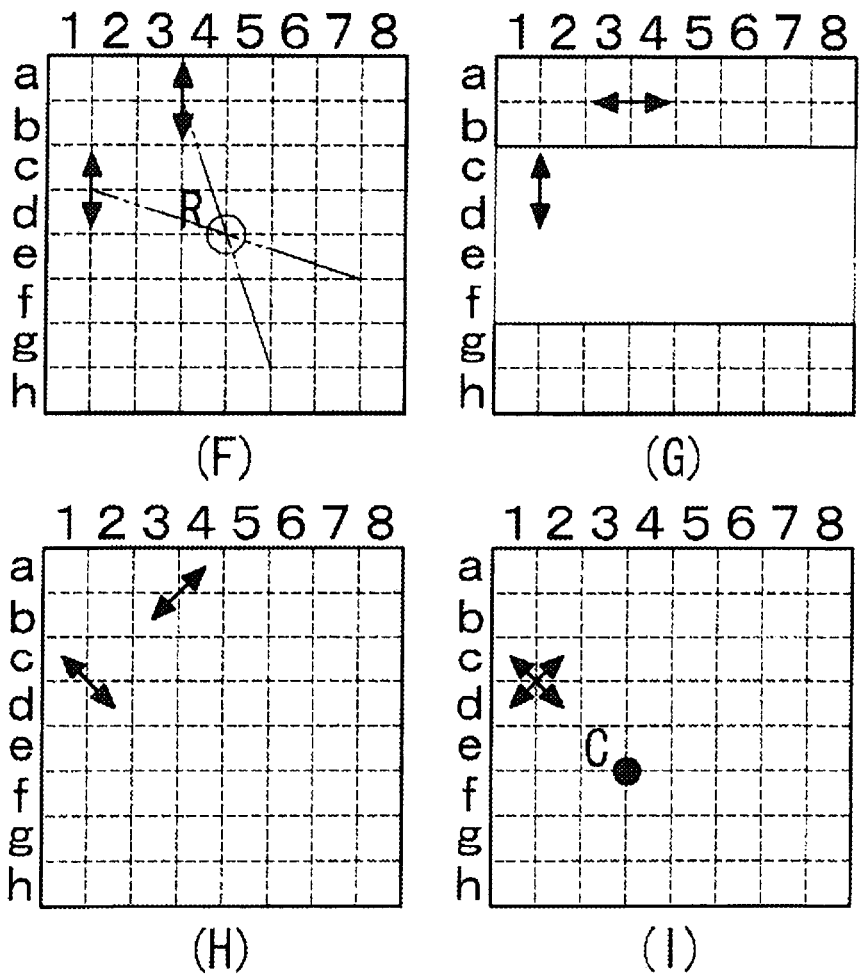
FIG. 8 is a view for explaining a polarization state of a propagating light which is reflected by the reflector and is incident on an optical path P2 in the optical circulator illustrated in FIG. 1.
Figure 9:
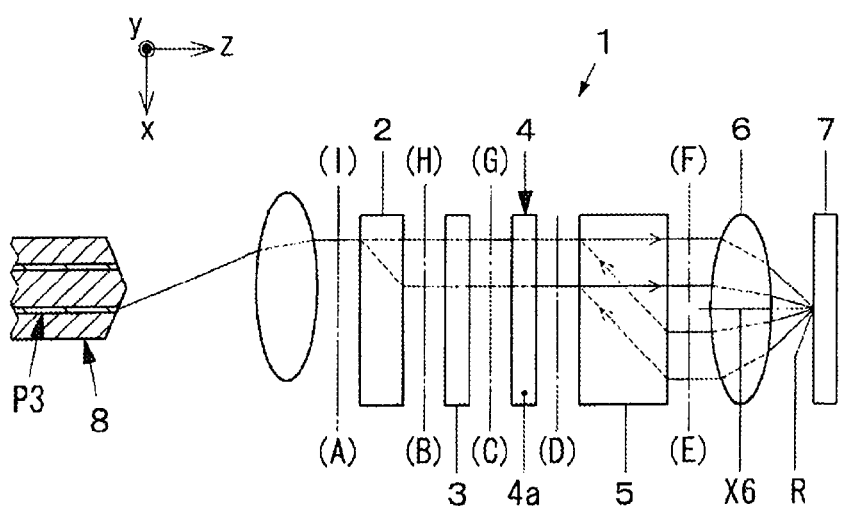
FIG. 9 is a plan view illustrating a constitution of an optical circulator of the present invention and an optical path of a light in the reverse direction.

Next, operations of the optical circulator 1 will be described. (A) to (I) of FIGS. 7 and 8 are views illustrating polarization states of forward direction light in the optical circulator 1 and correspond to the polarization state of each of the optical path cross sections illustrated in (A) to (I) of FIGS. 1 and 2. In FIGS. 7 and 8, the horizontal direction and the vertical direction are set to x-axis and y-axis, respectively, and the direction toward the paper is set to z-axis. For the convenience of explanation, each of the horizontal and vertical directions are divided into 8 portions, so that the propagation position of the polarization components on the cross section of each optical path can be represented by 1 to 8 in the horizontal direction and "a" to "h" in the vertical direction. In addition, according to the present invention, in FIG. 1, a reciprocating optical path from the optical fiber P1 through the reflector 7 to the optical fiber P2 is defined as a "forward direction", and a reciprocating optical path from the optical fiber P2 through the reflector 7 to the optical fiber P3 is defined as a "reverse direction".

If the light is incident on the optical fiber P1, the light propagates through the optical fiber P1 and emits from the light incidence/emission cross section which is formed to be slanted. When the light is emitted from the light incidence/emission cross section, the light is emitted with a slanted angle $\Phi$. As the beam diameter is extended with a predetermined spreading angle $\theta \cong \lambda/(\pi\omega_o)$, the light crosses the optical axis oa of the lens 9 and is incident on the surface of the lens 9.

The light incident on the lens 9 is emitted from the lens 9 so that the light is refracted outwards from the optical axis oa on the left-side convex surface of the lens 9 shown in FIG. 3, and thus, the light beam axis ba1 is parallel to the z-axis. The emitted light B1 is converted to a collimated light or a converged light.

As shown in FIG. 7(A), the incident position of the light that is incident from the lens 9 to the polarization separating element 2 is between 5 and 6 in the horizontal direction and between "g" and "h" in the vertical direction in a shape of matrix. In the embodiment, the positions are indicated by (5-6, g-h). The reference numeral C denotes the central point C, and reference numeral R denotes a reflection point of polarization components in the reflector 7.

As shown in FIGS. 5 and 7(B), the light emitted to the polarization separating element 2 is separated into two polarization components, that is, a ordinary ray perpendicular to the crystal axis X21 and an extraordinary ray parallel of the polarization separating element 2. In the forward direction, the propagation position of the extraordinary ray emitted from the polarization separating element 2 are (7-8, e-f) in FIG. 7(B).

The separated polarization components transmit through the polarization plane rotating element 3, so that the polarization components is rotated by 45° counterclockwise (in the left rotation direction) as shown in FIG. 7(C).

Next, among the polarization components, only the polarization component that becomes the ordinary ray at the time of transmitting through the polarization separating element 2 is incident on and transmits through the phase optical element 4b, and the other polarization component (polarization component that becomes the extraordinary ray at the time of transmitting through the polarization separating element 2) propagates through the space between the two phase optical elements 4a and 4b without a change thereof (refer to FIG. 5).

In this manner, the size of the phase optical element 4b is set so that only one polarization component can be transmitted through. As described above, since the crystal axis X4b of the phase optical element 4b is slanted by 45° with respect to the y-axis, the polarization direction of the polarization components transmitting through the phase optical element 4b is rotated by 90° as shown in FIG. 7(D). In this manner, the polarization directions of the two polarization components are aligned with the y-axis direction that is perpendicular to the crystal axis X51 of the polarization separating element 5.

Next, the light is incident on the polarization separating element 5. As shown in FIGS. 2, 5, and 7(D), the polarization separating element 5 are disposed along only the one-side optical path so that the forwardly propagating light can be incident before being reflected by the reflector 7.

As described above, since the polarization direction of each of the polarization components and the direction of the crystal axis X51 are perpendicular to each other, although the polarization planes of the two polarization components are incident on the polarization separating element 5, the two polarization components in the forward direction can be emitted from the polarization separating element 5 without shifting to the polarization separating element 5 while the polarization direction at the time of being incident on the polarization separating element is maintained as shown in FIG. 7(E).

In this manner, in the forward direction, the rotation direction of the polarization plane rotating element 3 between the two polarization separating elements 2 and 5 and the directions of crystal axes X4a and X4b of the phase element 4 are set so that the polarization planes of the two polarization components at the time of being incident on the polarization separating element 5 can be aligned with the direction perpendicular to the direction of the crystal axis X51.

Next, although the light having transmitted through the polarization separating element 5 is refracted with a predetermined refractive angle by the lens 6, the polarization state is not changed.

Figure 6:
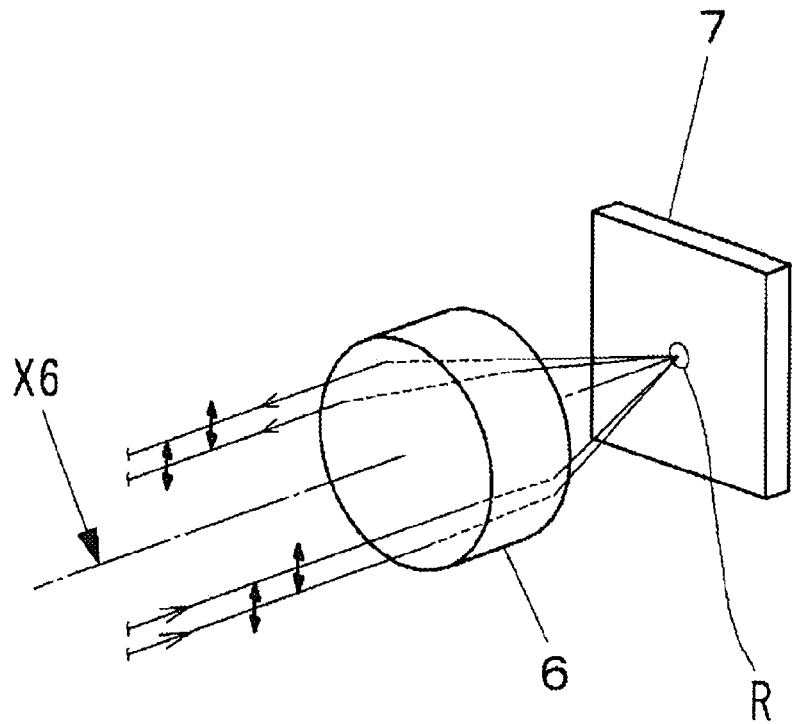
FIG. 6 is a perspective view illustrating a layout of optical elements from a lens to a reflector in the optical circulator illustrated in FIG. 1 and a polarization state of a propagating light in the forward direction.

Next, the light beams of the two polarization components having transmitted through the lens 6 are reflected by the reflector 7 so that the light beams are symmetric to each other with respect to one point R at the side opposite to the incident angle (refer to FIGS. 6, 7(E), and 8(F)). As shown in FIGS. 1 and 2, in the optical circulator 1 according to the present invention, the reflector 7 and the lens 6 are disposed at such positions that the reflection point R of the reflector 7 and the optical axis X6 of the lens 6 are located along the same line in the light propagating direction (z-axis direction). On the other hand, as clearly shown in FIGS. 1 and 2, the optical fibers P1 to P3 and the lens 6 are disposed at such positions that the central point C of the diagonal lines connecting the central axes fc of the optical fibers P1 to P3 and the optical axes X6 of the lens 6 are not located along the same line. Since the reciprocating optical path is formed by the reflector 7 that reflects the light, a total length of the optical circulator 1 can be reduced.

As shown in FIG. 8(F), the reflected light transmits through the lens 6 again, so that the light can be emitted from the position symmetric to the position of the case shown in FIG. 7(E) with respect to the optical axis x6 of the lens 6. In this case, the polarization states of light before and after the lens 6 are not changed.

Next, as shown in FIGS. 2 and 5, the light having transmitted through the lens 6 passes through an outer space of the polarization separating element 5 and only one polarization component transmits through the phase optical element 4a, so that the polarization directions are rotated by 90° and the polarization directions are perpendicular to each other as shown in FIG. 8(G). In this manner, the size of the phase optical element 4a is set so that only one polarization component can transmit through. At this time, the polarization component transmitting through the phase optical element 4a is a polarization component that also has transmitted through the phase optical element 4b just before. In this manner, the two phase optical elements 4a and 4b are disposed so that only one polarization component transmits through the two phase optical elements 4a and 4b. Therefore, only the other polarization component is rotated by 180° by the phase element 4.

Next, the two polarization components are incident on the polarization plane rotating element 3, so that the polarization planes are rotated by 45° counterclockwise as shown in FIG. 8(H). In this state, the propagation positions along the x-axis direction are different. However, as shown in FIG. 7(B), the state is the same as the polarization state after the light transmitting through the polarization separating element 2.

Next, the two polarization components transmits through the polarization separating element 2, so that the two polarization components are mixed at the propagation position (1-2, c-d) as shown in FIG. 8(I), and the mixed light B2 is incident on the lens 9. In addition, the light beam axis ba2 of the light B2 is refracted inwards (to the side of the optical axis oa) on the left-side convex surface of the lens 9 shown in FIG. 3 to be condensed, and the light is incident on the optical fiber P2.

Figure 13:
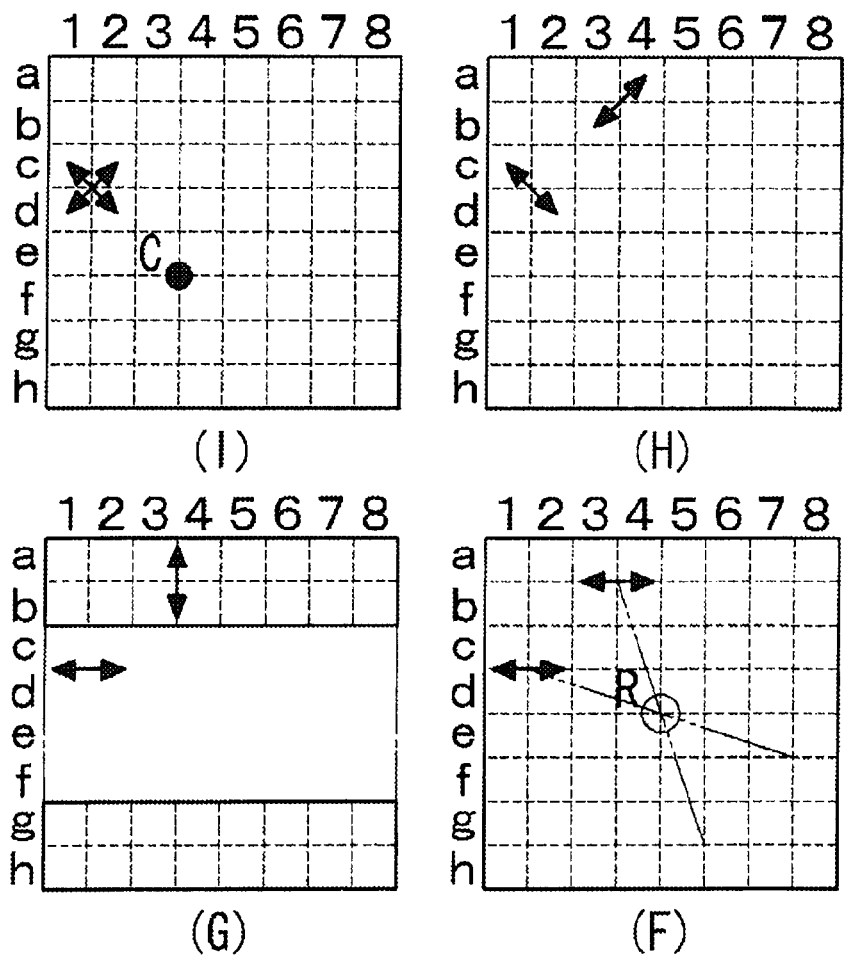
FIG. 13 is a view for explaining a polarization state of a propagating light which is emitted from an optical fiber P2 and is reflected by reflector in the optical circulator illustrated in FIG. 9.
Figure 14:
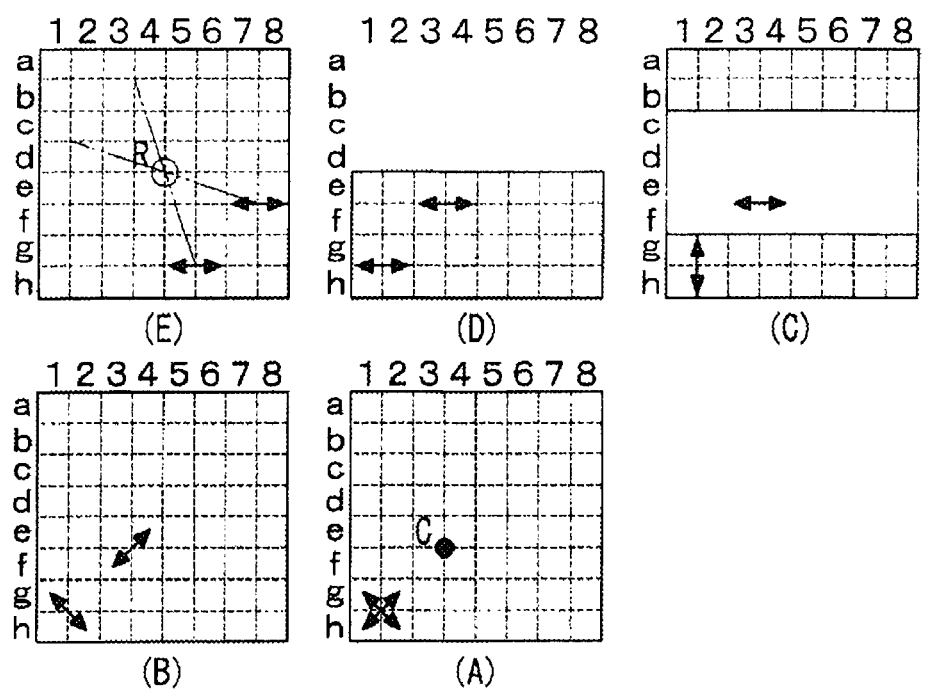
FIG. 14 is a view for explaining a polarization state of a propagating light which is reflected by the reflector and is incident on an optical fiber P3 in the optical circulator illustrated in FIG. 9.

Next, the operations of the polarization components in the reverse directional optical path from the optical fiber P2 to the optical fiber P3 will be described with reference to FIGS. 9 to 14. The description of the operations same as those in the forward direction will be omitted or simplified. (A) to (I) of FIGS. 13 and 14 are views illustrating the polarization states of the light in the reverse direction of the optical circulator 1, and correspond to the polarization states in the optical path cross sections shown in (A) to (I) of FIGS. 9 and 10, respectively. In FIGS. 13 and 14, the horizontal direction and the vertical direction are set to x-axis and y-axis, respectively, and the direction toward the paper is set to z-axis. For the convenience of explanation, each of the horizontal and vertical directions is divided into 8 portions, so that the propagation position of the polarization components can be represented.

As described above, the light that is emitted from the optical fiber P2 and converted to a collimated light or a converged light by the lens 9 is incident on the polarization separating element 2 at the incident position (1-2, c-d) thereof. The incident light is separated into a ordinary ray and an extraordinary ray by the polarization separating element 2. The separated polarization components are rotated counterclockwise by the polarization plane rotating element 3, so that the polarization components are aligned with the polarization directions that are parallel to the x-axis or the y-axis perpendicular to each other.

Figure 11:
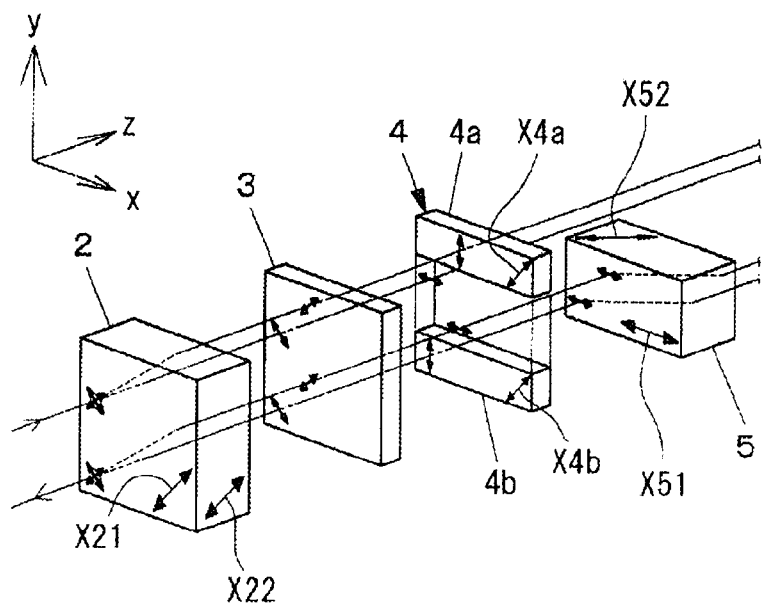
FIG. 11 is a perspective view illustrating a layout of optical elements of an optical element unit in the optical circulator illustrated in FIG. 9 and a polarization state of a propagating light in the reverse direction.
Figure 12:
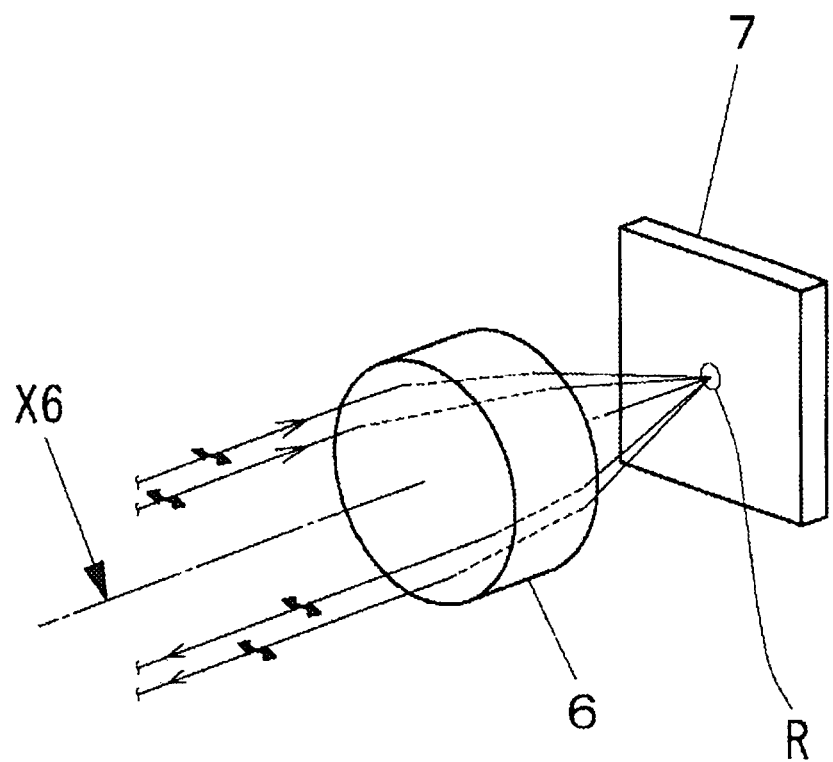
FIG. 12 is a perspective view illustrating a layout of optical elements from a lens to a reflector in the optical circulator illustrated in FIG. 9 and a polarization state of a propagating light in the reverse direction.

Next, among the polarization components, only the polarization component that becomes the extraordinary ray at the time of transmitting through the polarization separating element 2 is incident on and transmits through the phase optical element 4a, and the other polarization component (polarization component that becomes the ordinary ray at the time of transmitting through the polarization separating element 2) propagates through the space between the two phase optical elements 4a and 4b without a change thereof (refer to FIG. 11). As shown in FIG. 13(F), the polarization directions of the polarization components transmitting through the phase optical element 4a are rotated by 90°. Due to the rotation, the polarization directions of the two polarization components are aligned with the x-axis direction that is parallel to the crystal axis X51 of the polarization separating element 5.

Figure 10:
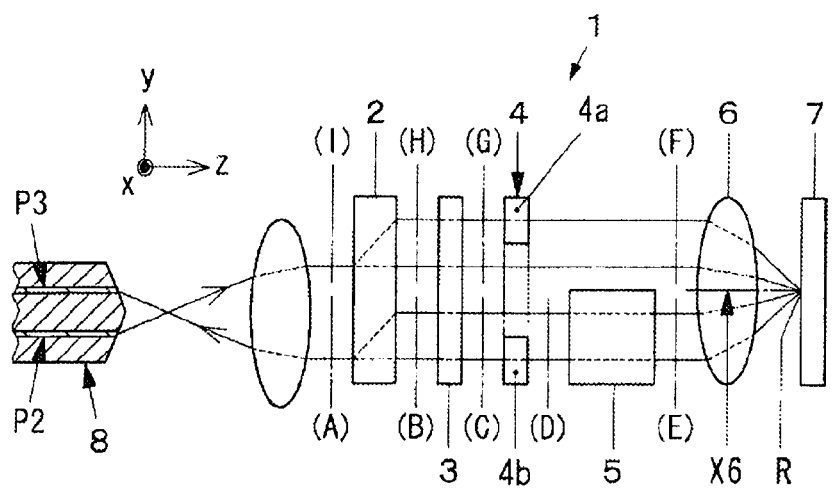
FIG. 10 is a side view illustrating the constitution of the optical circulator of the present invention and the optical path of the light in the reverse direction.

Next, as shown in FIGS. 10 and 11, the light having transmitted through the phase optical element 4a passes through an outer space of the polarization separating element 5 and is reflected by the reflector 7 with a point symmetry to be incident on the polarization separating element 5. As shown in FIGS. 11 and 14(E) to 14(D), each of the polarization components incident on the polarization separating element 5 is shifted by the same amount in the x-axis direction.

Subsequently, only one polarization component among the two polarization components transmits through the phase optical element 4b, the polarization direction is rotated by 90° and the polarization directions are perpendicular to each other as shown in FIG. 14(C). At this time, the polarization components transmitting through the phase optical element 4b is a polarization components that has transmitted through the phase optical element 4a just before. In this manner, the two phase optical elements 4a and 4b are disposed so that only one polarization component transmits through the two phase optical elements. Therefore, only the other polarization component is rotated by 180° by the phase element 4.

Next, the two polarization components are incident on the polarization plane rotating element 3, so that each of the polarization planes is rotated by 45° counterclockwise as shown in FIG. 14(B). In this state, the propagation positions along the y-axis direction are different. However, as shown in FIG. 13(H), the state is the same as the polarization state after the light transmitting through the polarization separating element 2.

Next, the two polarization components transmit through the polarization separating element 2, so that the two polarization components are mixed at the propagation position (1-2, g-h) as shown in FIG. 14(A), and the mixed light is condensed by the lens 9 to be incident on the optical fiber P3.

In order to couple the propagation light with all the optical fibers P1 to P3 that are disposed at an equivalent distance from the central point C, a thickness of the polarization separating element 5 is adjusted so that the shift amount of the extraordinary ray by the polarization separating element 5 can be larger than the shift amount of the extraordinary ray by the polarization separating element 2 in the optical circulator 1.

As described above, in the optical circulator 1 according to the present invention, all the optical fibers P1 to P3 are disposed at an equivalent distance from the central point C, so that it is possible to prevent non-uniformity of insertion losses of reciprocating optical paths of the optical circulator 1 and to stabilize the insertion losses.

In addition, the directions of the crystal axes X21 and X51 on the optical planes of the polarization separating elements 2 and 5 are set to be different from each other by 45°, the polarization plane rotating element 3 and the phase element 4 are disposed between the two polarization separating elements 2 and 5, and the rotation direction of the polarization plane rotating element 3 and the directions of the crystal axes X4a and X4b of the phase element 4 are suitably set, so that both of the polarization components can be shifted to be extraordinary rays by the polarization separating element 5. Therefore, it is possible to prevent the occurrence of the PDL caused from shifting of only one polarization component at the time of transmitting through the polarization separating element 5. In addition, since the two polarization components are reflected with a point symmetry by the reflector 7, a difference in optical path length between two polarization components of before-reflection and two polarization components of after-reflection can be adjusted to be zero, so that it is possible to prevent the occurrence of the PDL.

In addition, the polarization separating element 5 is disposed so as for the light in the forward direction to be incident on the polarization separating element 5 before being reflected by the reflector 7, so that it is possible to prevent the occurrence of the PDL and to implement small-sized optical elements. If the second polarization separating element 5 is disposed so as for the light in the forward direction to be incident on the second polarization separating element 5 after being reflected by the reflector 7, both of the two polarization components are shifted by the polarization separating element 5 in the reverse direction light path, and after that, the two polarization components are reflected by the reflector 7. As a result, the distances between the reflection point R and the two polarization components are not equal to each other, so that the PDL occurs. Accordingly, it is preferable that the second polarization separating element 5 is disposed at such a position as described in the embodiment.

In addition, the optical fibers P1 to P3 are disposed so as for the central axes fc of all the optical fibers P1 to P3 to be located at an equivalent distance from the central point C, so that the distances between the light incidence/emission cross sections of the optical fibers P1 to P3 and the optical axis oa of the lens 9 are set to be equal to each other. Therefore, the beam diameters of the light emitted from the lens 9 and incident on the lens 9 can be set to be equal to each other. Thus, it is possible to easily align the centers of the light incidence/emission unit 8 and the optical element unit and the centers of the lens 6 and the reflector 7.

In addition, if a level of the requirement for the characteristics of the optical circulator 1 is not relatively high, the aforementioned constitution may be modified so that the distances between the optical fibers P1 to P3 and the central point C are slight different from each other within a tolerance limit.

Figure 15:
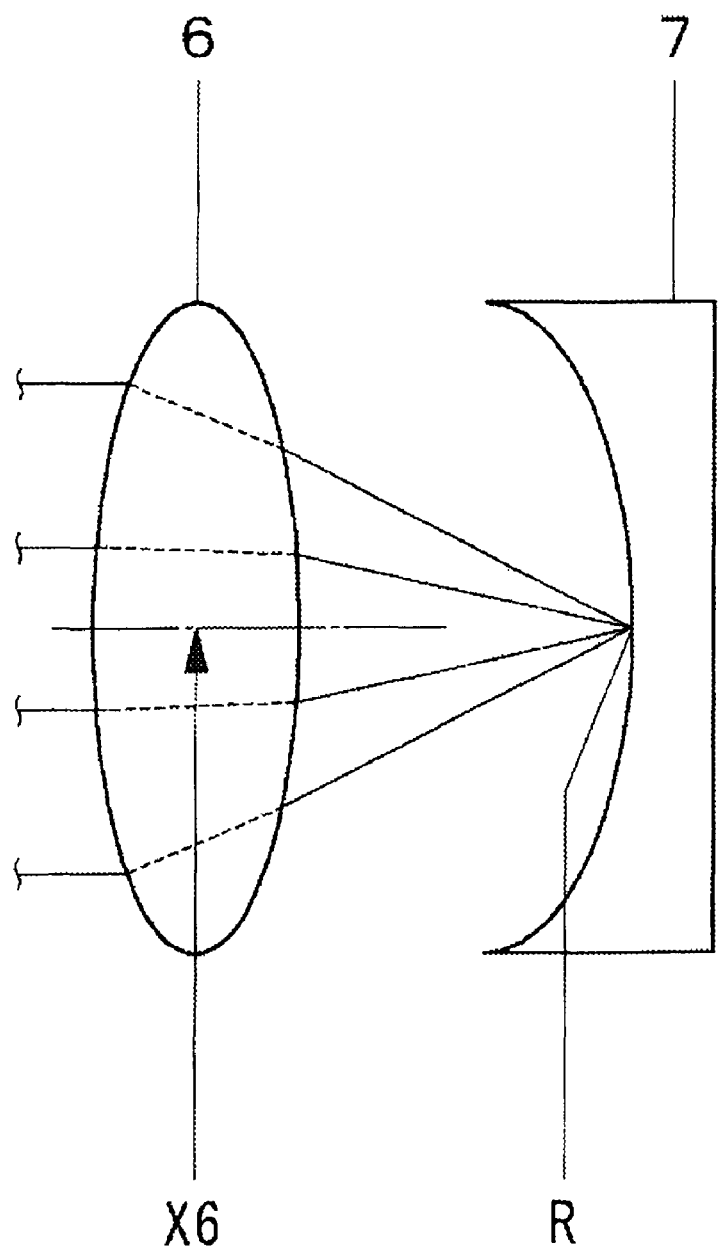
FIG. 15 is a schematic view illustrating a modified example of a reflector.
Figure 16:
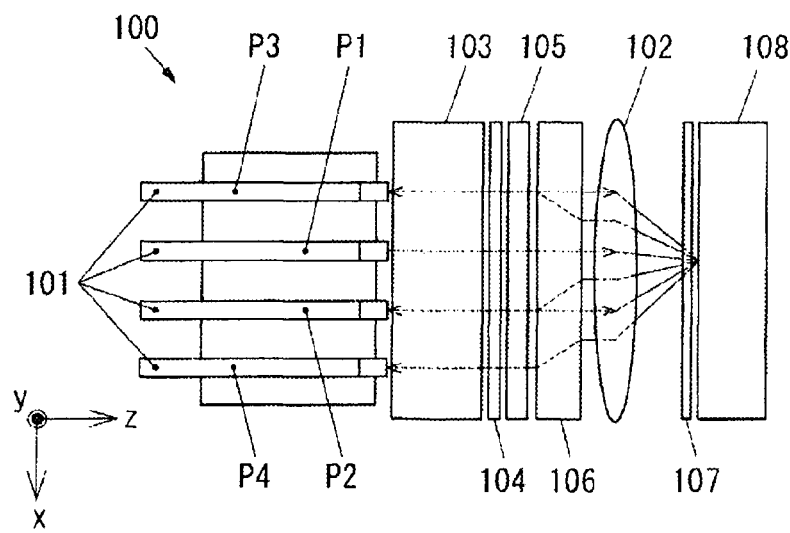
FIG. 16 is a plan view illustrating an example of a conventional optical circulator.
Figure 17:
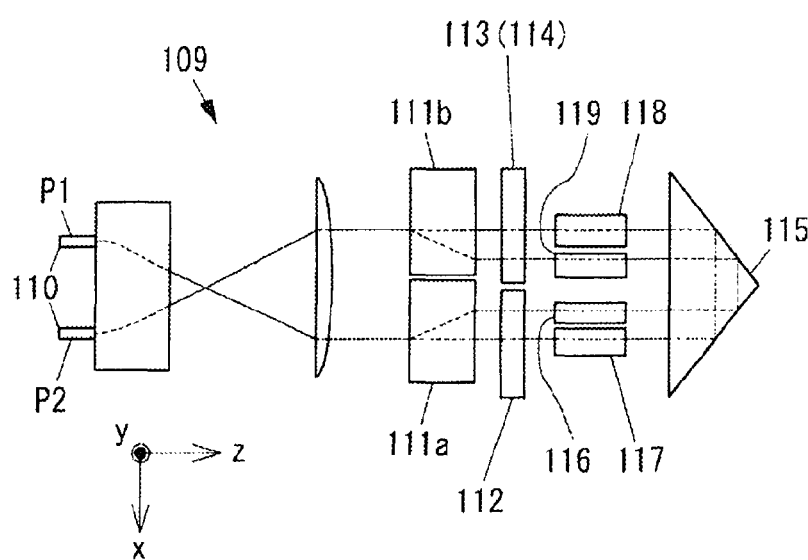
FIG. 17 is a plan view illustrating another example of a conventional optical circulator.
Figure 18:
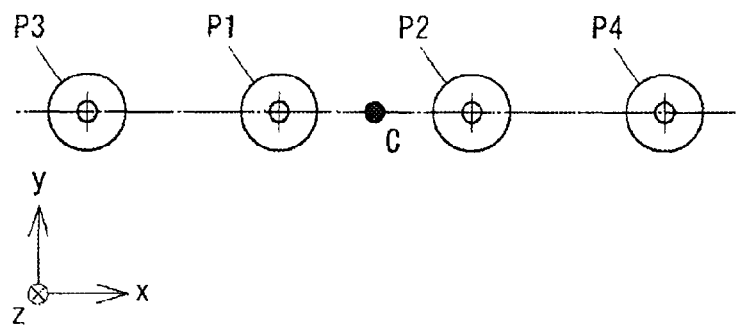
FIG. 18 is a view illustrating a constitution of a light incidence/emission unit as the optical circulator illustrated in FIG. 16 is seen from a z-axis direction toward a reflector.
Figure 19:
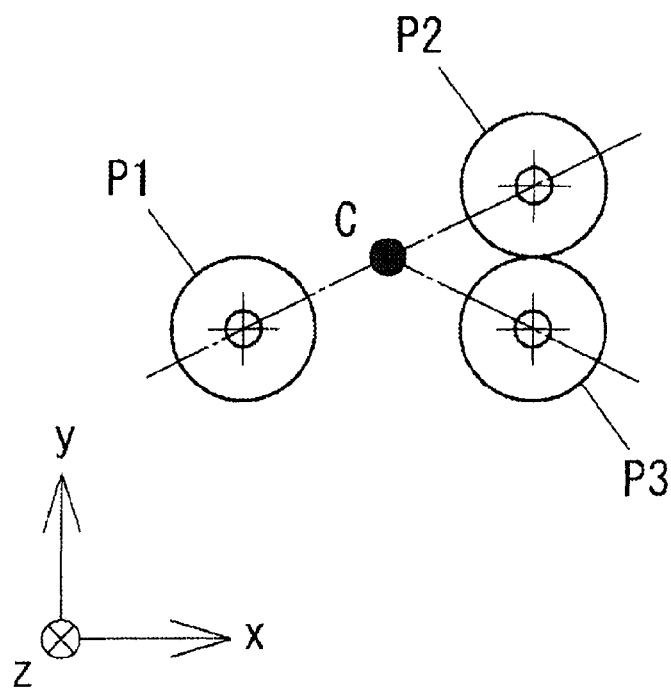
FIG. 19 is a view illustrating a constitution of a light incidence/emission unit as the optical circulator illustrated in FIG. 17 is seen from a z-axis direction toward a reflector.

In addition, the present invention may be modified in various manners based on the above-mentioned technological idea. As shown in FIG. 15, the reflector 7 may be constructed with a concave mirror. In use of the concave mirror, a tolerance of coupling of the optical element unit with the lens 6 in the optical circulator 1 can be alleviated, so that it is possible to easily align the centers of the light incidence/emission unit 8, the optical element unit, and the lens 6.

In addition, a birefringent prism or a polarization beam splitter can be used as a substitute for the birefringent single crystal for the polarization separating elements 2 and 5. In addition, instead of the GIF, a new lens may be disposed in the vicinity of the light incidence/emission cross sections of the optical fibers P1 to P3. Alternatively, a glass plate may be disposed in the y-axis direction of the polarization separating element 5.

INDUSTRIAL APPLICABILITY

An optical circulating apparatus according to the present invention can be used as a non-reciprocal optical device in an optical communication system, optical measurement, or the like.

The invention claimed is:

1. A reflective optical circulator having an optical element unit, said optical element unit comprising: a first polarization separating element, a non-reciprocal polarization plane rotating element having a rotation angle of 45°, a phase element for rotating a polarization plane of an incident light by 90°, and a second polarization separating element, wherein a light incidence/emission unit where at least three waveguides are arrayed is disposed at one end side of the optical element unit, and a lens and a reflector are disposed at a side opposite to the light incidence/emission unit with the optical element unit interposed between the light incidence/emission unit and both the lens and the reflector, wherein the first polarization separating element, the polarization plane rotating element, the phase element, and the second polarization separating element are sequentially disposed from the side of the light incidence/emission unit, wherein all the waveguides are disposed at an equivalent distance from a central point of diagonal lines connecting central axes of the waveguides, wherein directions of crystal axes on optical planes of the first and second polarization separating elements are different from each other by 45°, wherein a shift amount of an extraordinary ray in the second polarization separating element is set to be larger than a shift amount of an extraordinary ray in the first polarization separating element, wherein a direction of the rotation angle of the polarization plane rotating element is set to be counterclockwise as seen from the light incidence/emission unit, wherein the phase element is constructed with two phase optical elements which are a first phase optical element and a second phase optical element, a size of each phase optical element is set so that only one polarization component among two polarization components of a ordinary ray and an extraordinary ray separated by the first polarization separating element can transmit through, and each of the phase optical elements is disposed so that said only one polarization component can transmit through the two phase optical elements, wherein, among the two polarization components separated by the first polarization separating element, the polarization component that becomes the extraordinary ray at the time of transmitting through the first polarization separating element transmits through the first phase optical element after the two polarization components are reflected by the reflector, and the polarization component that emitted from the light incidence/emission unit to the first polarization separating element becomes the ordinary ray at the time of transmitting through the first polarization separating element transmits through the second phase optical element, wherein a size of the second polarization separating element is set so that light emitted from the light incidence/emission unit and reflected by the reflector transmits through only one among a going path and a returning path of an optical path of light reciprocating the optical element unit, wherein the two polarization components are reflected by the reflector with a point symmetry, wherein a reflection point of the reflector and an optical axis of the lens are located along a same line in a propagation direction of light, and the central point of the diagonal lines connecting the central axes of the waveguides and the optical axis of the lens are not located along the same line, and wherein the second polarization separating element is disposed so that the light in a forward direction is incident on the second polarization separating element before being reflected by the reflector.

2. The reflective optical circulator according to claim 1, wherein the reflector is a concave mirror.

* * * * *